United States Patent [19]
Rikukawa et al.

[11] Patent Number: 5,940,629
[45] Date of Patent: Aug. 17, 1999

[54] SYSTEM FOR SELECTING DRIVE REPLACEMENT AND OPENING INFORMATION TRANSMISSION PATH AFTER REPLACEMENT PERMISSION OF THE SELECTED DRIVE IS GRANTED

[75] Inventors: Hitoshi Rikukawa; Kyouichi Isomura; Masahiro Kodama; Akira Saito; Yoshitsugu Taki, all of Kanagawa, Japan

[73] Assignee: Sony Corporation, Japan

[21] Appl. No.: 08/895,238

[22] Filed: Jul. 16, 1997

[30] Foreign Application Priority Data

Jul. 19, 1996 [JP] Japan ................................ P08-207586

[51] Int. Cl.[6] ...................................................... G06F 13/10
[52] U.S. Cl. .......................... 395/882; 395/835; 395/282; 395/283
[58] Field of Search .................................... 395/283, 282, 395/882, 835

[56] References Cited

U.S. PATENT DOCUMENTS

| | | | |
|---|---|---|---|
| 4,835,737 | 5/1989 | Herrig et al. | 364/900 |
| 5,023,831 | 6/1991 | Bonke et al. | 364/900 |
| 5,515,515 | 5/1996 | Kennedy et al. | 395/283 |
| 5,530,810 | 6/1996 | Bowman | 395/283 |
| 5,564,024 | 10/1996 | Pemberton | 395/283 |
| 5,664,119 | 9/1997 | Jeffries et al. | 395/283 |
| 5,757,594 | 5/1998 | Dang et al. | 360/191 |
| 5,758,101 | 5/1998 | Pemberton | 395/283 |

Primary Examiner—Thomas C. Lee
Assistant Examiner—Ilwoo Park
Attorney, Agent, or Firm—Rader, Fishman & Grauer; Ronald P. Kananen

[57] ABSTRACT

An information managing apparatus for providing an external apparatus with requested information in response to an instruction from the external apparatus and/or recording information has an accommodation unit for accommodating recording media, a plurality of replaceable drives for recording and/or reproducing information onto and/or from the recording media, and a transfer means for taking out a desired recording medium from the accommodation unit and transferring it to a selected one of the drives. One of manipulation means is manipulated to select a drive as a subject of replacement. A control means opens an information transmission path between the selected drive and the external apparatus. After confirming the opening of the information transmission path, the control means causes a display means to display a message to the effect that the replacement of the drive concerned has been permitted.

8 Claims, 9 Drawing Sheets

SYSTEM FOR SELECTING DRIVE REPLACEMENT AND OPENING INFORMATION TRANSMISSION PATH AFTER REPLACEMENT PERMISSION OF THE SELECTED DRIVE IS GRANTED

BACKGROUND OF THE INVENTION

The present invention relates to an information managing apparatus for providing an external apparatus with requested information in response to an instruction from the external apparatus and/or recording information onto a given recording medium.

Recording media used in a computer system include magnetic disks (a hard disk, a flexible disk, and the like) and a magnetic tape. And information managing apparatuses are known which are equipped with a plurality of drive units for such recording media and are capable of managing information by recording and/or reproducing a large amount of information.

For example, in an apparatus using magnetic tapes as recording media (hereinafter referred to as "tape library apparatus"), a number of tape cassettes each incorporating a magnetic tape are accommodated in a prescribed accommodation rack. A desired one of the tape cassettes is taken out by a transfer mechanism and then mounted in a selected one of a plurality of tape drive units. Data recording/reproduction is then performed.

A control means in the tape library apparatus exchanges information with an external apparatus such as a host computer. The tape library apparatus manages information such that it provides the external apparatus with requested information in response to an instruction from the external apparatus by reproducing that information from a magnetic tape through a tape drive unit, or it records information onto a magnetic tape.

Incidentally, in the above type of information managing apparatus, the supply of power to the entire system including a host computer and a tape library apparatus needs to be stopped during replacement of a tape drive unit. That is, at the occurrence of some trouble in the system, in a periodical maintenance/inspection operation, or in like events, it is necessary to remove a tape drive unit from the apparatus or replace a tape drive unit. In such a case, the main power needs to be turned off to stop the system.

However, such a system stop is unfavorable to users. Where a tape library apparatus operates as a data server in a large-scale system, a system down possibly causes serious damage. Therefore, a stop of power supply to the system is not permitted or should be avoided by taking any measures available. It is desired that replacement or the like of a tape drive unit be conducted with the power supply to the system continued, i.e., with the apparatus kept online.

However, if a drive unit is replaced without opening a transmission path between the apparatus and the external apparatus, there is a possibility that electrically adverse effects occur in the drive unit or the transmission path (a bus, for instance), resulting in damage of the drive unit, occurrence of a data error due to introduction of noise, unstable behavior of the system, and other problems.

SUMMARY OF THE INVENTION

An object of the present invention is therefore to enable an operation of replacing a drive that constitutes an information managing apparatus to be conducted reliably and efficiently.

To attain the above object, the invention provides manipulation means to be manipulated to select a drive as a subject of replacement from among a plurality of drives, control means for opening an information transmission path between the selected drive and an external apparatus, and display means for displaying a message to the effect that replacement of the selected drive has been permitted when opening of the information transmission path between the selected drive and the external apparatus has been confirmed by the control means.

According to the invention, when a drive is replaced, a message indicating permission of the replacement of the drive is displayed after opening of an information transmission path between the drive and the external apparatus. Therefore, there can be prevented an event that the drive is replaced before opening of the transmission path.

When an information reading or writing request is issued from the external apparatus, a signal indicating that the drive concerned is under replacement is sent to the external apparatus to make it recognize the status of the drive. Thus, an undesirable confusion can be avoided.

The drives and interface units are arranged alternately in a drive accommodation unit. A first connection terminal for a connection to the associated drive is provided in each interface unit at a position opposite a transfer means, and a second connection terminal opposed to the first connection terminal in provided in each drive. With this configuration, the drives are accommodated in the drive accommodation unit in a detachable manner from the side opposite the transfer means. Thus, an operation of replacing a drive can be made easier and quicker.

Further, the drives are connected to each other by daisy chain connections, and a pair of connectors for connecting an interface unit to each drive are constructed such that a power line is connected before the other lines, i.e., signal lines, when the interface unit and the drive are connected to each other, and that the power line is disconnected last when they are separated from each other. Thus, when a drive is replaced, connections can be made in a reliable manner without failing to follow an operation procedure.

DESCRIPTION OF THE PREFERRED EMBODIMENT

Figure 1:
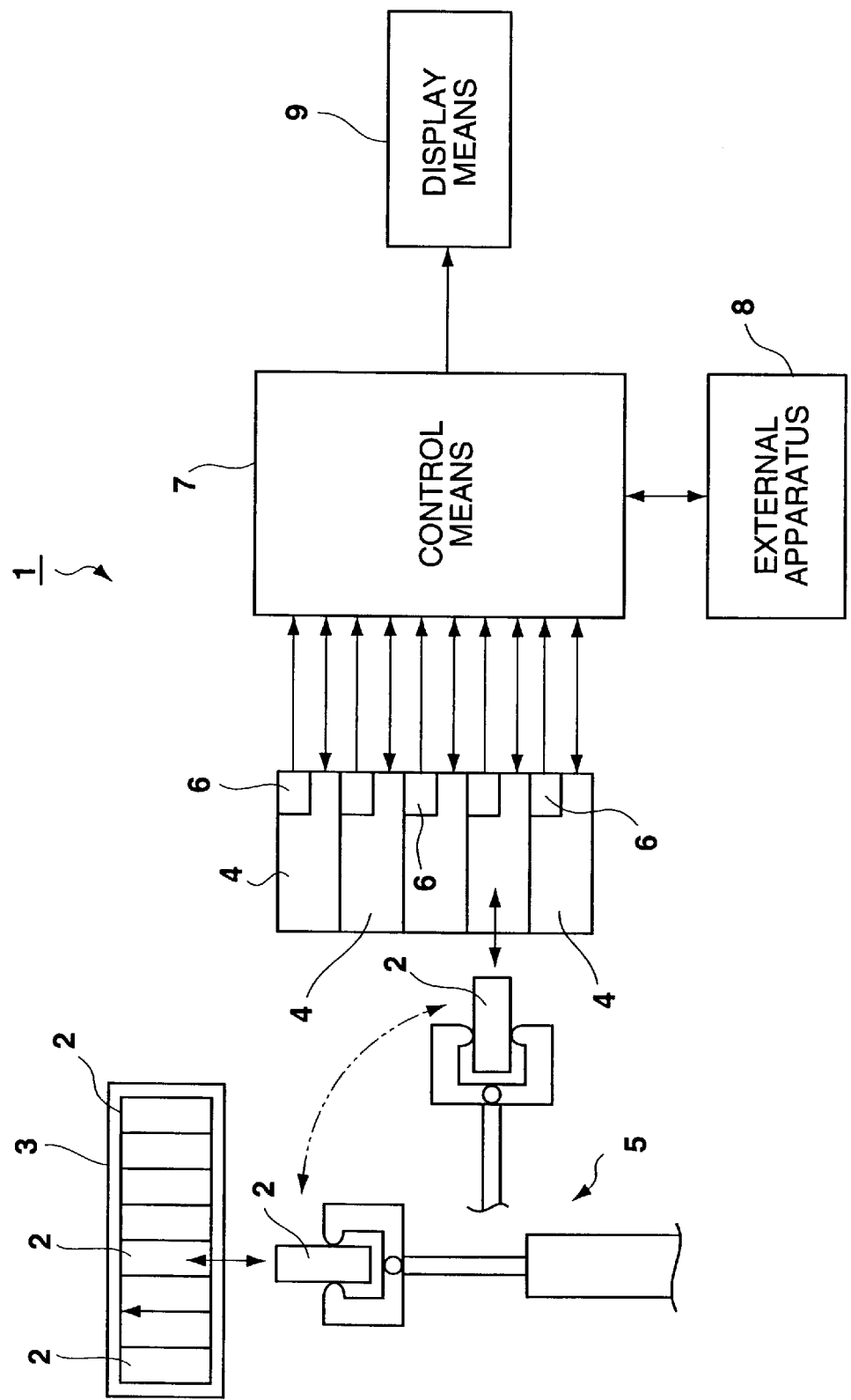
FIG. 1 is a block diagram showing the basic configuration of an information managing apparatus according to the present invention.

FIG. 1 shows the basic configuration of an information managing apparatus 1 according to the invention. The information managing apparatus 1 has an accommodation unit 3 for accommodating recording media 2, a plurality of replaceable drives 4 for performing reproduction and/or recording on recording media 2, and a transfer means 5 for taking out a desired recording medium from the accommodation unit 3 and transferring it to one of the drives 4.

In the invention, the recording media 2 include recording media according to any recording schemes such as magnetic recording and magneto-optical recording and having any shapes such as a disk and a tape.

When at least one of the drives 4 is replaced, the drive 4 to be replaced is selected by manipulating the corresponding one of manipulation means 6. In response, the manipulation means 6 outputs a selection signal, which is supplied to a control means 7. The manipulation means 6 may be provided on the respective drives 4 as shown in FIG. 1, or provided collectively on a control panel or the like.

The control means 7 performs a control to reproduce requested information from the recording media 2 with the drives 4 in response to an instruction from an external apparatus 8 (a host computer, for instance) and provide it to the external apparatus 8, or a control to record write-requested information onto the recording media 2 with the drives 4. When one of the drives 4 is selected by the corresponding manipulation means 6, the control means 7 opens an information transmission path between the drive 4 and the external apparatus 8. Further, when an information read or write request is issued from the external apparatus 8 with respect to a drive 4 whose transmission path for communication with the external apparatus 8 has been opened, the control means 7 sends to the external apparatus 8 a signal indicating that the drive 4 is under replacement, to thereby let the external apparatus 8 to recognize the status of the drive 4.

When the control means 7 has confirmed opening of the information transmission path between a drive 4 and the external apparatus 8, a display means 9 displays, in response to a signal from the control means 7, a message to the effect that replacement of the drive 4 is permitted.

As for the replacement of a drive 4, it is desired that the operation time be as short as possible. To this end, the following items need to be attained:

(1) Constructing the drives in unit form so that they can be detachably mounted in the information managing apparatus.

(2) Allowing an electrical connection between the drives and the control means to be established by a predetermined procedure in a simple and reliable manner.

Figure 2:
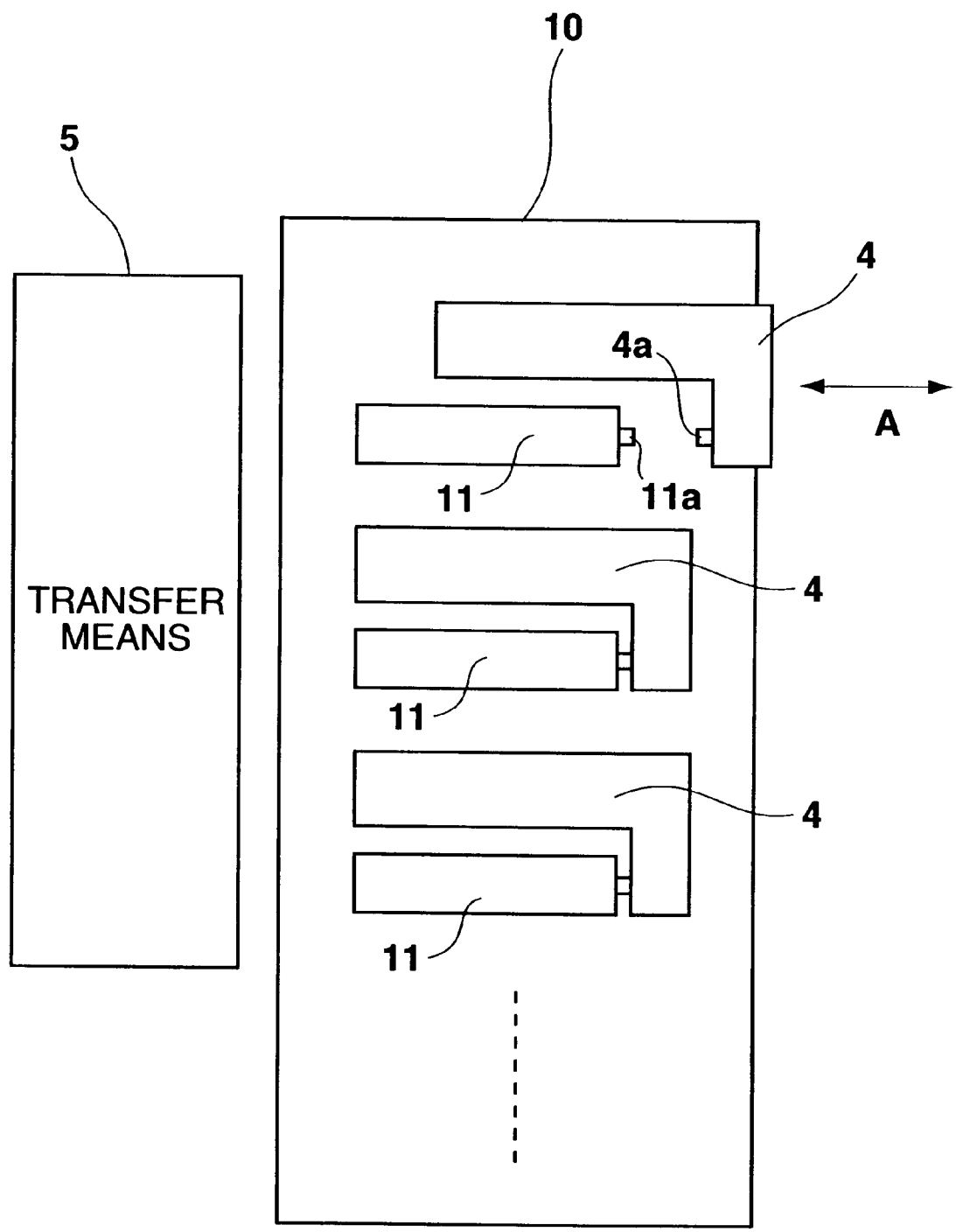
FIG. 2 schematically shows connections between tape drive units and interface units.

As for item (1), for example, a drive accommodation unit 10 for accommodating the drive units 4 so that they are arranged in a given direction and interface units 11 for connecting the drives 4 to the control means 7 individually are provided as shown in FIG. 2. The drives 4 and the interface units 11 are arranged alternately in the drive accommodating unit 10. Connection terminals 11a for a connection to the drives 4 are provided in the interface units 11 on the side opposite the transfer means 5, and connection terminals 4a corresponding to the connection terminals 11a are provided in the drives 4. Further, the drive accommodation unit 10 is so constructed as to allow the drives 4 to be detachably inserted into the drive accommodation unit 10 from the side opposite the transfer means 5 as indicated by arrow A in FIG. 2. As a result, when a drive 4 is replaced or taken out, the drive 4 does not interfere with the transfer means 5 and hence the drive 4 can easily be attached to or removed from the drive accommodation unit 10.

As for item (2), for example, the drives 4 are connected to each other in the form of daisy chain connections (a connection scheme in which devices are connected to each other in series and data is transferred sequentially via a bus), and interfaces 11 for connecting the drives 4 to the control means 7 individually are provided. A drive 4 and an interface 11 are connected to each other by a pair of connectors so that a power line is connected before the other lines, i.e., signal lines, in connecting the drive 4 and interface 11 to each other and is disconnected last in separating them from each other (for example, the connectors may be such that pins for power terminals are made longer than the other pins for signal terminals). With this measure, an operation of replacing a drive 4 can be conducted efficiently according to a given procedure without stopping power supply to the system (including the information managing apparatus 1 and the external apparatus 8).

As an example of the above type of connector pair, a pair of connectors conforming to the SCA (single connector attachment) standard are known, which are used in a hard disk array, for instance. The SCA standard prescribes a physical layer specification to realize a connection between devices conforming to the SCSI (small computer system interface) standard by a pair of connectors. By using such a connector pair, a drive can easily be replaced online without stopping power supply to the system.

An embodiment in which the invention is applied to a tape library apparatus will be hereinafter described with reference to FIGS. 3–9.

Figure 3:
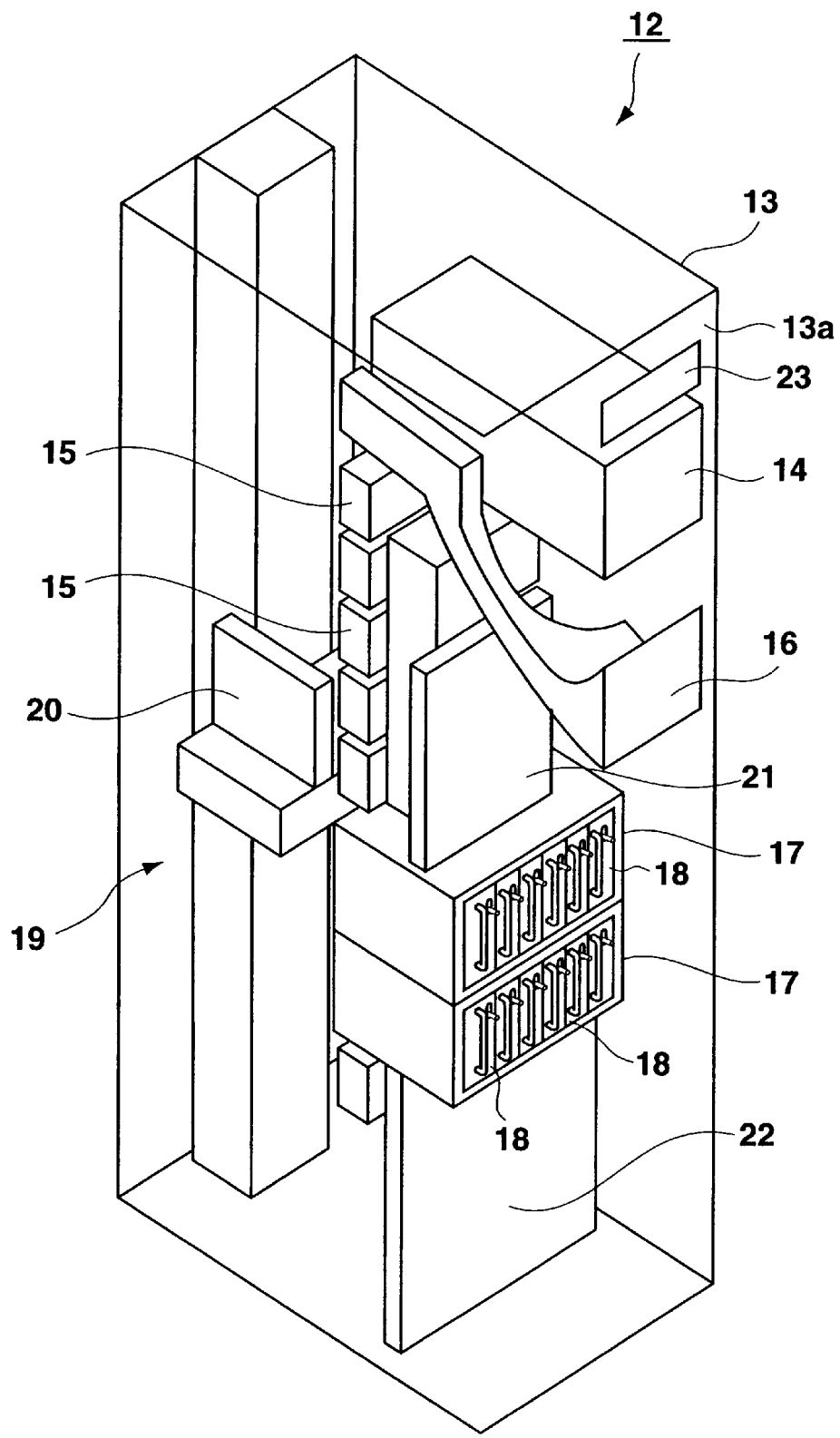
FIG. 3 shows a general configuration of a tape library apparatus according to an embodiment of the invention.

FIG. 3 shows a general configuration of a tape library apparatus 12. The tape library apparatus is constructed such that tape cassettes (not shown) are supplied to accommodation racks 15 which are arranged vertically above the center of an outer chassis 13 of the apparatus 12 through a supply unit 14 which is attached to a front panel 13a of the outer chassis 13. An ejection unit 16 for ejecting a tape cassette to the outside of the apparatus 12 is provided below the supply unit 14.

Tape drive units 18 are arranged horizontally in each of drive accommodation units 17 which are disposed below the accommodation racks 15.

A transfer mechanism 19 for taking out a desired cassette from the accommodation racks 15 and transferring it to a selected one of the tape drive units 18 or performing an opposite operation is disposed so as to be opposed to the accommodation racks 15 and the drive accommodation units 17. The transfer mechanism 19 is a three-dimensional, orthogonal type robot, for instance. FIG. 3 shows a hand arm 20 of the transfer mechanism 19 and its components relating to the vertical and horizontal axes.

A mechanics control unit 21 for controlling the transfer mechanism 19 is provided above the drive accommodation units 17. A system control unit 22 as a control center of the tape library apparatus 12 is provided below the drive accommodation units 17.

A liquid crystal display 23, which corresponds to the above-mentioned display means 9, is attached to the front panel 13a of the outer chassis 13 at a position close to and above the supply unit 14.

Figure 4:
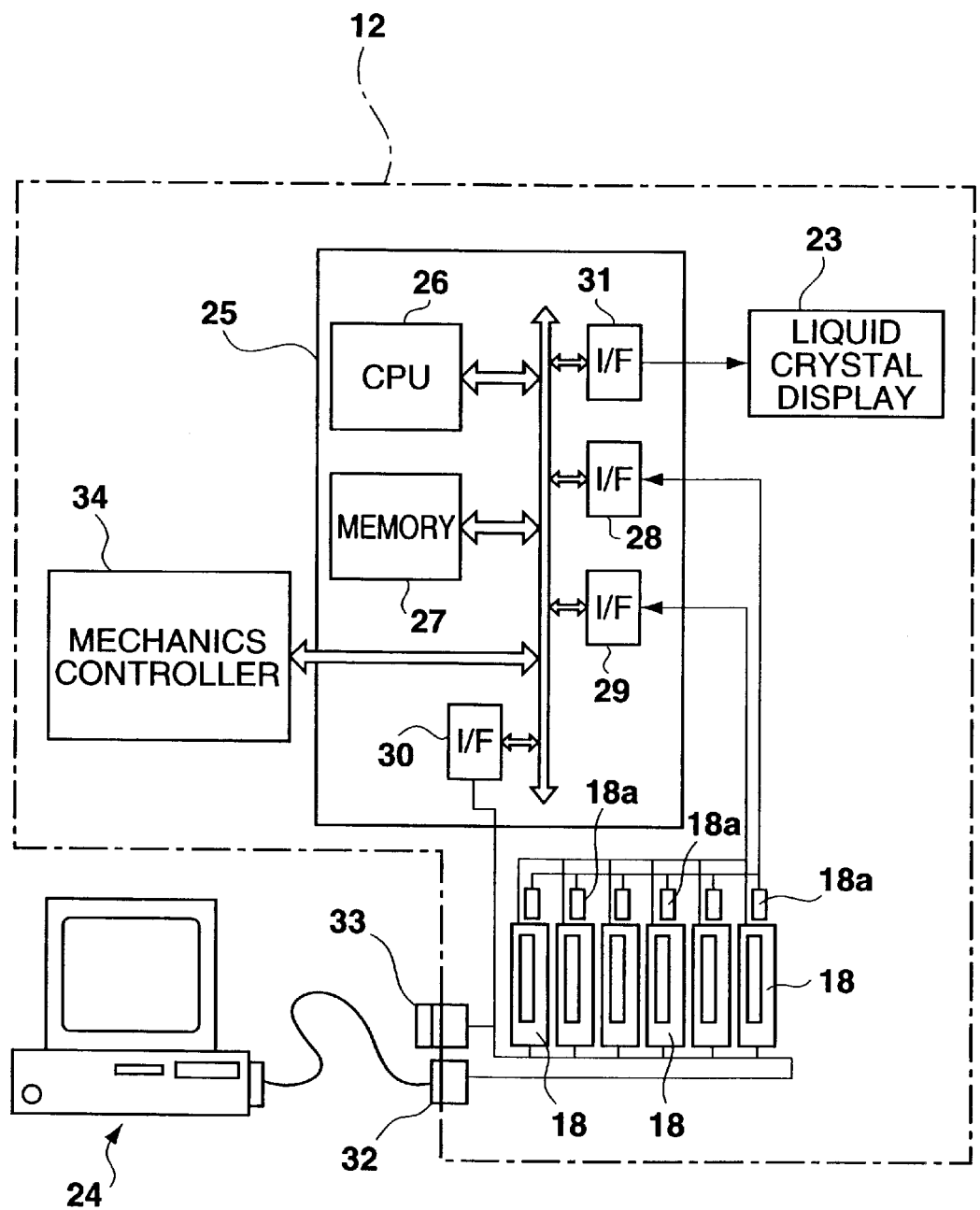
FIG. 4 is a block diagram showing an internal configuration of the tape library apparatus of FIG. 3 and a host computer.

FIG. 4 shows the main part of an internal configuration of the tape library apparatus 12 and a host computer 24. The tape drive units 18 and a library controller 25, which corresponds to the above-mentioned control means 7, are given different SCSI-ID numbers (identification numbers); that is, what is called a multi-ID scheme is employed.

The library controller 25 (included in the system control unit 22) of the tape library apparatus 12 incorporates a CPU 26, a memory 27 which includes a RAM and a ROM, and interfaces 28–31.

The tape drive units 18 are connected to each other in the form of daisy chain connections. Switches 18a, which correspond to the above-mentioned manipulation means 6, are provided for the respective tape drive units 18. When one of the tape drive units 18 is replaced, a selection signal is sent from the corresponding switch 18a to the library controller 25 via the interface 28. Communications for, for instance, checking presence/absence of a tape cassette in each tape drive unit 18 are performed between the tape drive units 18 and the library controller 25 via the serial interface 29. Data transmission between the tape drive units 18 and the library controller 25 is performed via the SCSI interface 30.

The tape library apparatus 12 is also provided with a SCSI interface 32 for a connection to the host computer 24. The SCSI interface 32 is connected to the tape drive units 18. The SCSI daisy chain connection network is terminated by a terminator (termination resistor) 33.

A mechanics controller 34 (included in the above-mentioned mechanics control unit 21) has a role of controlling the transfer mechanism 19. The mechanics controller 34 performs an information exchange with the library controller 25.

The library controller 25 sends display information to the liquid crystal display 23 via the interface 31.

Figure 5:
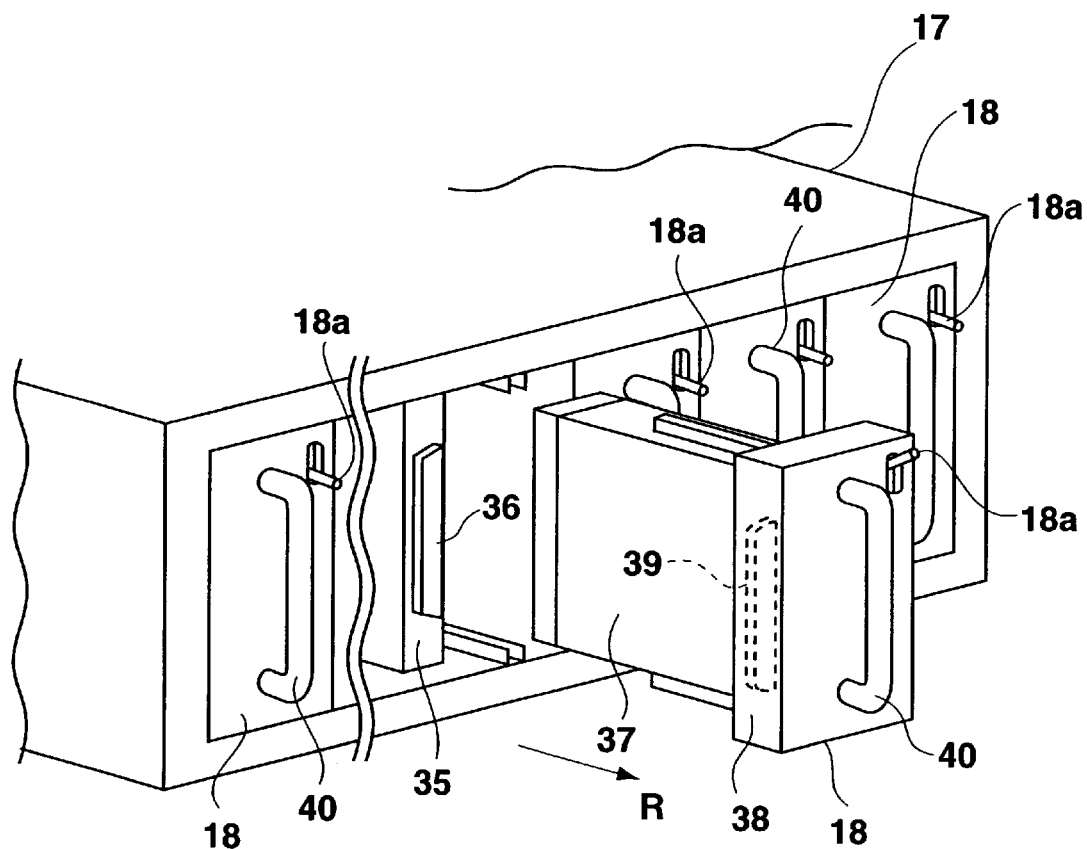
FIG. 5 is a perspective view showing tape drive units and part of a drive accommodation unit therefor.

FIG. 5 shows a state that the tape drive units 18 are accommodated in the rack-like drive accommodation unit 17 so as to be arranged horizontally in a row.

Interface circuit units 35 (only one of those is shown in FIG. 5) for mediating between the library controller 25 and the tape drive units 18 are each disposed between adjacent ones of the tape drive units 18. Each interface circuit unit 35 is provided with a SCA connector 36 for a connection to the associated tape drive unit 18. The SCA connector 36 is directed to the side as indicated by arrow R in FIG. 5, which corresponds to the front side of the tape library apparatus 12 in FIG. 3. The term "SCA connector" means a connector that conforms to the above-mentioned SCA standard which was established to prescribe a connection between devices that conform to the SCSI standard by means of a pair of connectors.

Each tape drive unit 18 is constituted of a main body 37 which includes a magnetic tape recording/playback section, and a connection section 38 for a connection to the corresponding interface circuit unit 35. The connection section 38 is provided with a SCA connector 39 directed to the side opposite to the side indicated by arrow R, and corresponds to the SCA connector 36 provided in the interface circuit unit 35. The connection section 38 is also provided with the above-mentioned switch 18a for sending a replacement request to the library controller 25 in replacing the associated tape drive unit 18. Further, a handle 40 for facilitating a replacement operation is attached to the connection section 38.

To take out a tape drive unit 18 from the drive accommodation unit 17, first the switch 18a is manipulated and then the tape drive unit 18 is pulled out in the direction of arrow R in a state that removal of the tape drive unit 18 is permitted. As a result, the connection between the SCA connector 39 of the connection section 38 and the SCA connector 36 of the interface circuit unit 35 is canceled. To mount a tape drive unit 18 in the drive accommodation unit 17, first the main body 37 of the tape drive unit 18 is inserted along the side face of the interface circuit unit 35, a connection is then made between the SCA connector 39 of the connection section 38 and the SCA connector 36 of the interface circuit unit 35, and the switch 18a is manipulated to restore the original state. In this manner, an operation of replacing a tape drive unit 18 can be conducted quickly.

Figure 6:
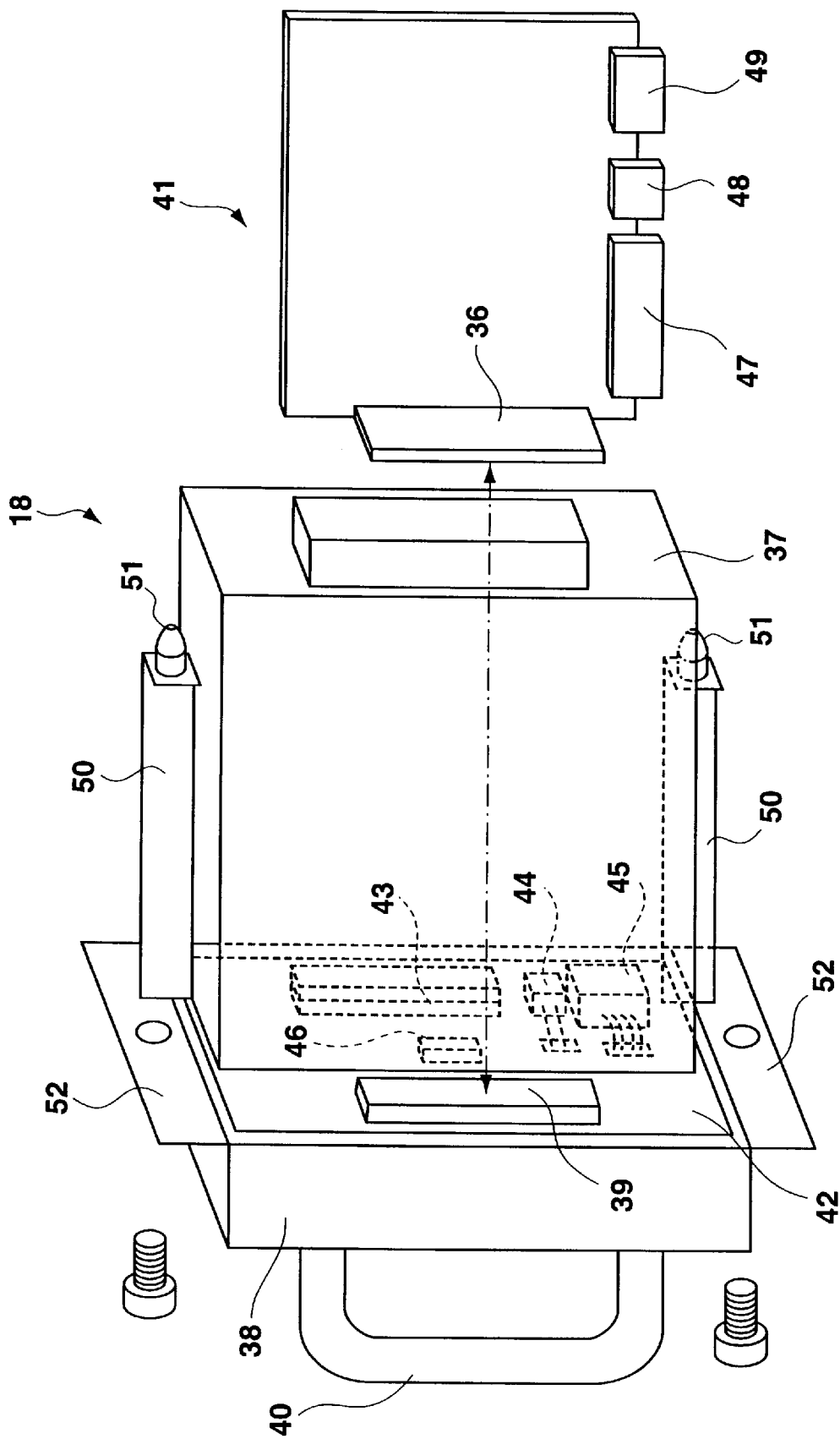
FIG. 6 is a perspective view schematically showing one of the tape drive units and an interface circuit board.

FIG. 6 schematically shows one of the tape drive units 18 and a conversion board 41 of the interface circuit unit 35.

A conversion board 42 is provided in the connection unit 38 of the tape drive unit 18, and is mounted with 80-pin SCA connector 39, a 68-pin wide SCSI connector 43, a 12-pin SCSI-ID setting connector 44, a 4-pin power connector 45, and a serial interface connector 46. The connectors other than the SCA connector 39 are incorporated in the main body 37. The SCA connector 39 is constructed such that connection terminals relating to the SCSI connector 43, the SCSI-ID setting connector 44 and the power connector 45, and the other terminals, i.e., control signal terminals, are collectively incorporated in a single connector.

The conversion board 41 is mounted with a SCA connector 36, a wide SCSI connector 47, a serial interface connector 48, and a power connector 49. The wide SCSI connector 47 and the serial interface connector 48 are connected the interfaces 30 and 29, respectively, of the library controller 25.

Each tape drive unit 18 may be fixed to the drive accommodation unit 17 in various manners. For example, guide members 50, guide pins 51, and other members are provided on the top and bottom faces of the main body 37, and fixing pieces 52 are provided on the top and bottom faces of the connection unit 38. With this configuration, the tape drive unit 18 is fixed to a predetermined portion of the drive accommodation unit 17 by screwing.

Figure 7:
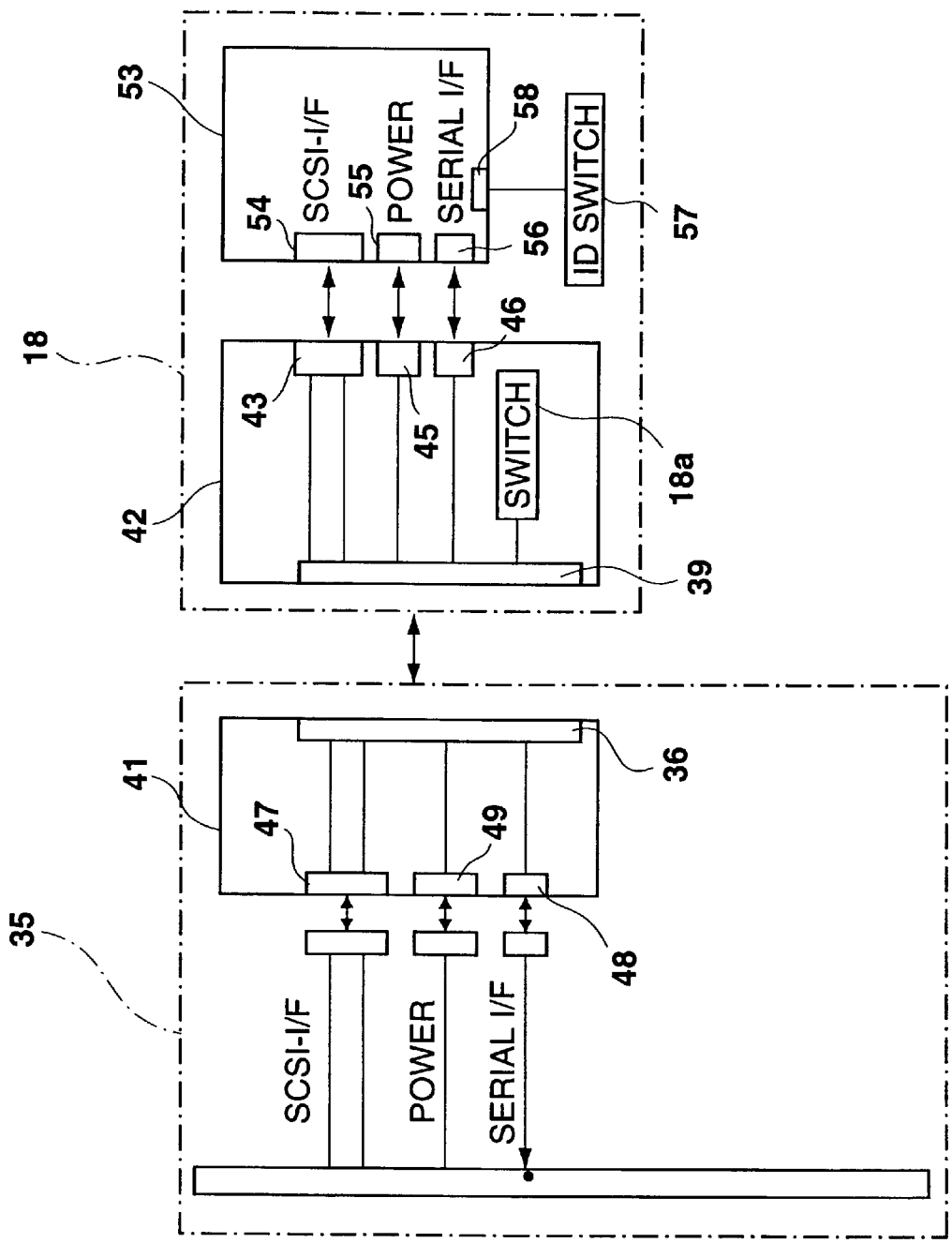
FIG. 7 shows a connection state between each tape drive unit and an interface circuit unit.

FIG. 7 shows a circuit connection state between each tape drive unit 18 and the interface circuit unit 35.

In the conversion board 41, the SCSI connector 47, the power connector 49, and the serial interface connector 48 are connected to the SCA connector 36.

In the conversion board 42, the SCSI connector 43, the power connector 45, the serial interface connector 46, and the switch 18a are connected to the SCA connector 39. A control board 53 in the tape drive unit 18 is provided with a SCSI connector 54, a power connector 55, and a serial interface connector 56 which correspond to the SCSI connector 43, the power connector 55, and the serial interface connector 46, respectively, as well as with a connection section 58 for an ID setting switch 57.

If the SCA connectors 36 and 39 were not used, an operation of replacing tape drive units 18 would be cumbersome because several connectors would have to be removed from and inserted into each tape drive unit 18. Further, if the connectors are inserted or removed in erroneous order, noise might be brought into the SCSI bus or a drive unit 18 might be damaged, for instance. By employing the SCA connectors 36 and 39, the above problems can be solved; a tape drive unit 18 can be replaced by simple operations of removal and insertion on a pair of connectors, and electrical influence on the SCSI bus and the tape drive unit 18 can be reduced.

Incidentally, trouble may occur if a tape drive unit 18 is replaced without attention to the operation states of the tape library apparatus 12 and the host computer 24. For example, a tape drive unit 18 should not be replaced while information is written to or read out from a magnetic tape in response to a request from the host computer 24. Even if a tape drive unit 18 is not in such a situation, other undesirable events may occur. For example, a tape drive unit 18 may be pulled out from the drive accommodation unit 17 at the very instant when a tape cassette is mounted in the tape drive unit 18. To avoid such events, the timing of a replacement operation should be managed by the library controller 25.

Figure 8:
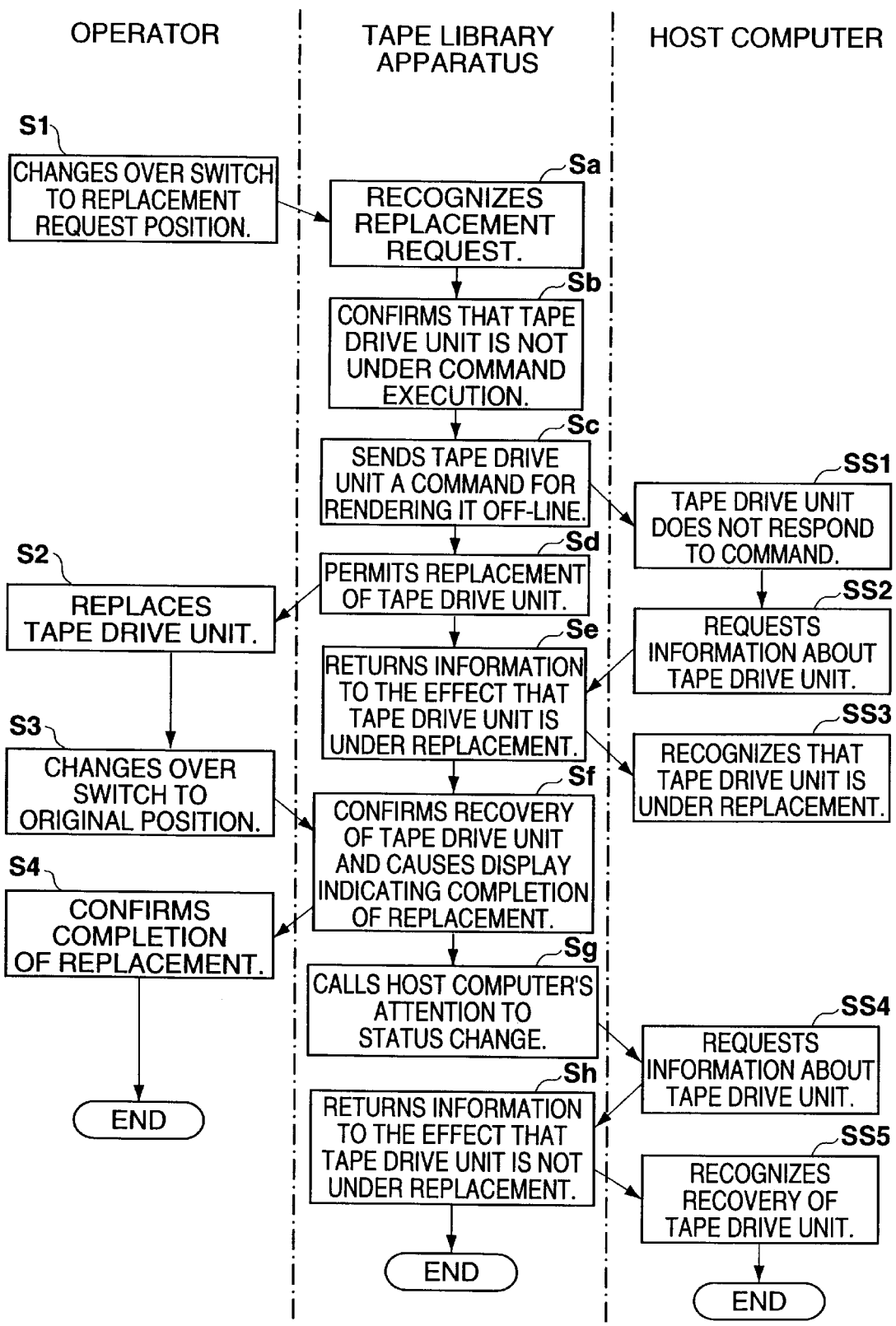
FIG. 8 shows a procedure of a tape drive unit replacement operation.

FIG. 8 shows a procedure for replacing a tape drive unit 18 of FIGS. 3–7 without stopping power supply to the system, separately for an operator, the tape library apparatus 12, and the host computer 24.

First, at step S1, an operator, who intends to replace a selected one of the tape drive units 18, changes over, to the replacement request position, the switch 18a that is attached to the tape drive unit 18 concerned.

In response, at step Sa, the library controller 25 (CPU 26) of the tape library apparatus 12 recognizes the replacement request on the tape drive unit 18. At step Sb, the library controller 25 confirms via the interface 29 that the tape drive unit 18 concerned is not under command execution (i.e., it is not recording or reproducing information or is not being accessed). At step Sc, the library controller 25 sends, to the tape drive unit 18, a command for rendering the SCSI interface of the tape drive unit 18 off-line. Then, the process goes to step Sd. The above command is sent via the serial interface.

At step Sd, the library controller 25 (CPU 26) gives replacement permission to the tape drive unit 18 concerned, and causes the liquid crystal display 23 to display a message to that effect.

Confirming the displayed content, at step S2 the operator performs an operation of replacing the tape drive unit 18.

On the other hand, the host computer 24 finds at step SS1 that the tape drive unit 18 as the subject of the replacement request does not respond to a command issued from the host computer 24. Therefore, at step SS2, the host computer 24 requests the tape library apparatus 12 to send information about the tape drive unit 18. In response, at step Se, the library controller 25 (CPU 26) of the tape library apparatus 12 returns to the host computer 24 information to the effect that the tape drive unit 18 is under replacement. Thus, at step SS3, the host computer 24 recognizes that fact.

After completion of the replacement operation, at step S3 the operator changes over the switch 18a that is attached to the tape drive unit 18 to the original position. Receiving a signal from the switch via the interface 28, at step Sf the library controller 25 (CPU 26) of the tape library apparatus 12 confirms the recovery of a replacement tape drive unit 18 and then causes the liquid crystal display 23 to display a message to the effect that the replacement operation has been completed. At step Sg, the library controller 25 (CPU 26) sends, to the host computer 24, information for calling its attention to the completion of the replacement operation.

At step S4, the operator confirms the completion of the replacement operation from the message displayed on the liquid crystal display 23. In response to the information sent from the library apparatus 12, at step SS4 the host computer 24 requests the tape library apparatus 12 to send information about the tape drive unit 18, in the same manner as in step SS2. In response, at step Sh, the library controller 25 (CPU 26) of the tape library apparatus 12 returns information including information to the effect that the tape drive unit 18 is not under replacement to the host computer 24 via the interfaces 29 and 30. Thus, at step SS5, the host computer 24 recognizes the recovery of the tape drive unit 18.

Figure 9:
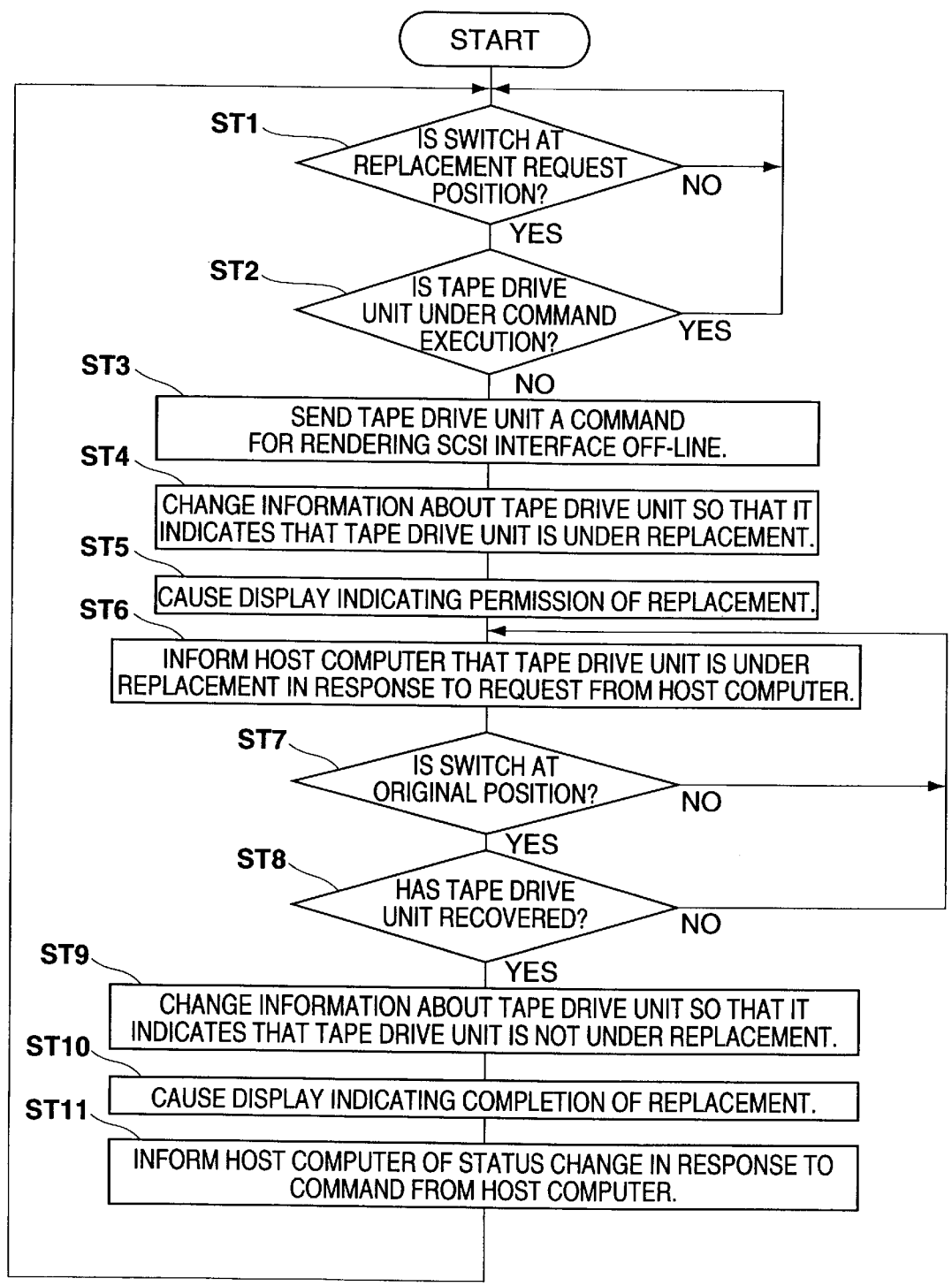
FIG. 9 is a flowchart showing a process to be executed by a library controller.

FIG. 9 shows a process to be executed by the library controller 25 (CPU 26) during replacement of a tape drive unit 18.

First, at step ST1, it is determined whether a switch 18a associated with a tape drive unit 18 as a subject of replacement is at the replacement request position. If the switch 18a is at the replacement request position, the process goes to step ST2. Otherwise, the determination at step ST1 is repeated.

At step ST2, it is judged whether the tape drive unit 18 as the subject of the replacement request is under execution of a command that relates to recording, playback, or the like. If the tape drive unit 18 is not under command execution, the process goes to step ST3. If it is under command execution, the process returns to step ST1.

At step ST3, the library controller 25 sends, to the tape drive unit 18, a command for rendering the SCSI interface off-line. At step ST4, the library controller 25 changes the information about the tape drive unit 18 so that it includes information to the effect that the tape drive unit 18 is under replacement. For this purpose, status information (hereinafter referred to as "read element status") that is predetermined between the tape library apparatus 12 and the host computer 24 can be utilized. The read element status information includes various kinds of information such as an ID number of the tape drive unit 18, an error code, presence/absence of the tape driver unit 18, and validity of data in the tape drive unit 18 (when the tape drive unit 18 is present). To indicate that the tape drive unit 18 is under replacement, for example, the error code value may be set at a particular value by using a proper flag or bits. It is preferable that the data format of the read element status information be unified irrespective of the kind of recording medium (magnetic tape in this embodiment). This makes it easier to deal with a library apparatus that uses plural kinds of recording media in a mixed manner.

At step ST5, the library controller 25 controls, via the interface 31, the liquid crystal display 23 so that it displays a message to the effect that the replacement of the tape drive unit 18 as the subject of the replacement request has been permitted.

At step ST6, when receiving read element status information from the host computer 24, the library controller 25 (CPU 26) returns data to the effect that the tape drive unit 18 is under replacement.

At step ST7, it is judged whether the switch 18a associated with the tape drive unit 18 as the subject of the replacement is at the original position. If it is at the original position, the process goes to step ST8. Otherwise, the process returns to step ST6.

At step ST8, it is checked whether a replacement tape drive unit 18 has recovered. If it has recovered, the process goes to step ST9. Otherwise, the process returns to step ST6.

At step ST9, the library controller 25 changes the read element status information so that it includes information to the effect that the tape drive unit 18 is not under replacement. At step ST10, the library controller 25 causes the liquid crystal display 23 to display a message to the effect that the replacement operation has been completed.

At step ST11, when receiving a command relating to the tape drive unit 18 from the host computer 24, the library controller 25 returns, to the host computer 24, a signal for calling its attention to the completion of the replacement operation. The host computer 24 then recognizes the recovery of the tape drive unit 18 from return information that is received after issuance of read element status information.

What is claimed is:

1. An information managing apparatus for providing an external apparatus with requested information in response to an instruction from the external apparatus and/or recording information, comprising:

an accommodation unit for accommodating a plurality of recording media;

a plurality of replaceable drives for recording and/or reproducing information onto and/or from the recording media;

a transfer means for taking out a desired recording medium from the accommodation unit and transferring it to a selected one of the drives;

manipulation means to be manipulated to select at least one of the drives for replacement;

control means for opening an information transmission path between the selected drive and the external apparatus and for granting replacement permission to the selected drive; and display means for displaying a message to the effect that replacement of the selected drive has been permitted when opening of the information transmission path between the selected drive and the external apparatus has been confirmed by the control means.

2. The information managing apparatus according to claim 1, wherein the control means is configured and arranged to send to the external apparatus a signal indicating that the drive is under replacement when the external apparatus issues an information writing or reading request to the transmission-path-opened drive.

3. The information managing apparatus according to claim 1, further comprising:

first interface means for inputting to the control means manipulation information that is issued from the manipulation means; and second interface means connected to the control means, for transmitting information that is in accordance with an instruction from the external apparatus between the drives and the external apparatus.

4. The information managing apparatus according to claim 1, further comprising:

interface units for connecting the control means to the respective drives individually; and a drive accommodation unit for accommodating the drives such that the drives and the interface units are arranged alternately in a predetermined direction.

5. The information managing apparatus according to claim 4, wherein the interface units are disposed on a side opposite the transfer means and each of the interface units has a first connector for establishing a connection to an associated one of the drives, and wherein each of the drives has a second connector that is opposed to and connected to an associated one of the first connectors so that the drive is mounted in and removed from the drive accommodation unit from the side opposite the transfer means.

6. The information managing apparatus according to claim 5, wherein the first and second connectors are constructed such that among a plurality of lines of the first and second connectors a power line is connected before signal lines when the first and second connectors are connected to each other and the power line is separated after the signal lines when the first and second connectors are separated from each other.

7. An information managing apparatus for providing an external apparatus with requested information in response to an instruction from the external apparatus and/or recording information, the information managing apparatus comprising:

an accommodation unit for accommodating a plurality of recording media;

a plurality of replaceable drives for recording and/or reproducing information onto and/or from the recording media;

a transfer means for taking out a desired recording medium from the accommodation unit and transferring it to a selected one of the drives;

control means for opening an information transmission path between the selected drive and the external apparatus and for granting replacement permission to the selected drive;

interface units for connecting the control means to the respective drives individually; and a drive accommodation unit for accommodating the plurality of drives such that the drives and the interface units are arranged alternately in a predetermined direction, wherein each of the interface units has a first connection terminal for a connection to an associated one of the drives at a position opposite the transfer means and each of the drives has a second connection terminal opposed to the first connection terminal so that the drive can freely be mounted in and removed from the drive accommodation unit from a side opposite the transfer means.

8. The information managing apparatus according to claim 7, wherein the interface units connect the drives to form daisy chain connections, and wherein the first and second connection terminals are a pair of connectors that are constructed such that a power line is connected before signal lines when the interface unit is connected to the drive and the power line is separated after the signal lines when the interface unit is separated from the drive.

* * * * *